(12) United States Patent
Moon et al.

(10) Patent No.: US 8,085,380 B2
(45) Date of Patent: Dec. 27, 2011

(54) SPACER AND LIQUID CRYSTAL DISPLAY DEVICE HAVING THE SAME

(75) Inventors: Yeon-Kyu Moon, Gunpo-si (KR);
Yeon-Cu Kim, Asan-si (KR);
Young-Kuil Joo, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 11/933,304

(22) Filed: Oct. 31, 2007

(65) Prior Publication Data

US 2008/0151173 A1     Jun. 26, 2008

(30) Foreign Application Priority Data

Dec. 21, 2006     (KR) .................. 10-2006-0131912

(51) Int. Cl.
*G02F 1/1339*     (2006.01)

(52) U.S. Cl. .......................................... 349/155; 349/56
(58) Field of Classification Search ........... 349/155–157
See application file for complete search history.

(56) References Cited

U.S. PATENT DOCUMENTS 6,806,223 B2 * 10/2004 Jensen ......................... 502/150

FOREIGN PATENT DOCUMENTS

| | | |
|---|---|---|
| JP | 5713425 | 1/1982 |
| JP | 427917 | 1/1992 |
| JP | 06-011719 | 1/1994 |
| JP | 2000321582 | 11/2000 |
| KR | 1020050056326 | 6/2005 |

* cited by examiner

*Primary Examiner* — Kevin S Wood
(74) *Attorney, Agent, or Firm* — H.C. Park & Associates, PLC

(57) ABSTRACT

A spacer includes a spacer main body and a coating layer. The coating layer encompasses the spacer main body and comprises a dendrimer.

17 Claims, 10 Drawing Sheets

SPACER AND LIQUID CRYSTAL DISPLAY DEVICE HAVING THE SAME

CROSS-REFERENCE TO RELATED APPLICATIONS

This application claims priority from and the benefit of Korean Patent Application No. 10-2006-0131912, filed on Dec. 21, 2006, which is incorporated herein by reference for all purposes as if fully set forth herein.

BACKGROUND OF THE INVENTION

1. Field of Invention

The present invention relates to a spacer and a liquid crystal display device having the same. More particularly, the present invention relates to a spacer and a liquid crystal display device including the same, where the spacer has improved adhesion for maintaining a cell gap between two substrates to prevent light leakage from the liquid crystal display device.

2. Discussion of the Background

A liquid crystal display (LCD) device includes a first substrate, a second substrate facing the first substrate, and a liquid crystal layer disposed between them.

An optical characteristic of the LCD device is closely related to a cell gap between the two substrates. Particularly, optical characteristics such as contrast ratio or viewing angle of the LCD device are known to be dependent on a value of a birefringence (An) of liquid crystal multiplied with the cell gap. Thus, if the cell gap of the LCD device is not uniform, the optical characteristic will also not be uniform.

A spacer of spherical shape, which may be called a beads spacer is prevalently used to maintain the cell gap between the two substrates. The spacer maintains the cell gap by contacting alignment layers formed on the surfaces of both substrates.

However, movement of the spacer caused by vibration or an impact to the LCD device may damage the surface of the alignment layer because the spacer is not permanently fixed. A damaged part of the alignment layer may cause light to leak, reducing control of the liquid crystal on the damaged part.

SUMMARY OF THE INVENTION

The present invention provides a spacer having improved adhesion.

The present invention also provides a LCD device including a spacer having improved adhesion.

Additional aspects and/or advantages of the present invention will be set forth in part in the description which follows and, in part, will be obvious from the description, or may be learned by practice of the present invention.

An exemplary embodiment of the present invention discloses a spacer that includes a spacer main body and a coating layer encompassing the spacer main body. The spacer includes a hyper branch polymer.

An exemplary embodiment of the present invention discloses a liquid crystal display (LCD) device including a first substrate, a second substrate facing the first substrate and a liquid crystal layer disposed between the first substrate and the second substrate. A spacer maintains a gap between the first substrate and the second substrate. The spacer includes a spacer main body and a coating layer encompassing the spacer main body. The coating layer includes a hyper branch polymer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
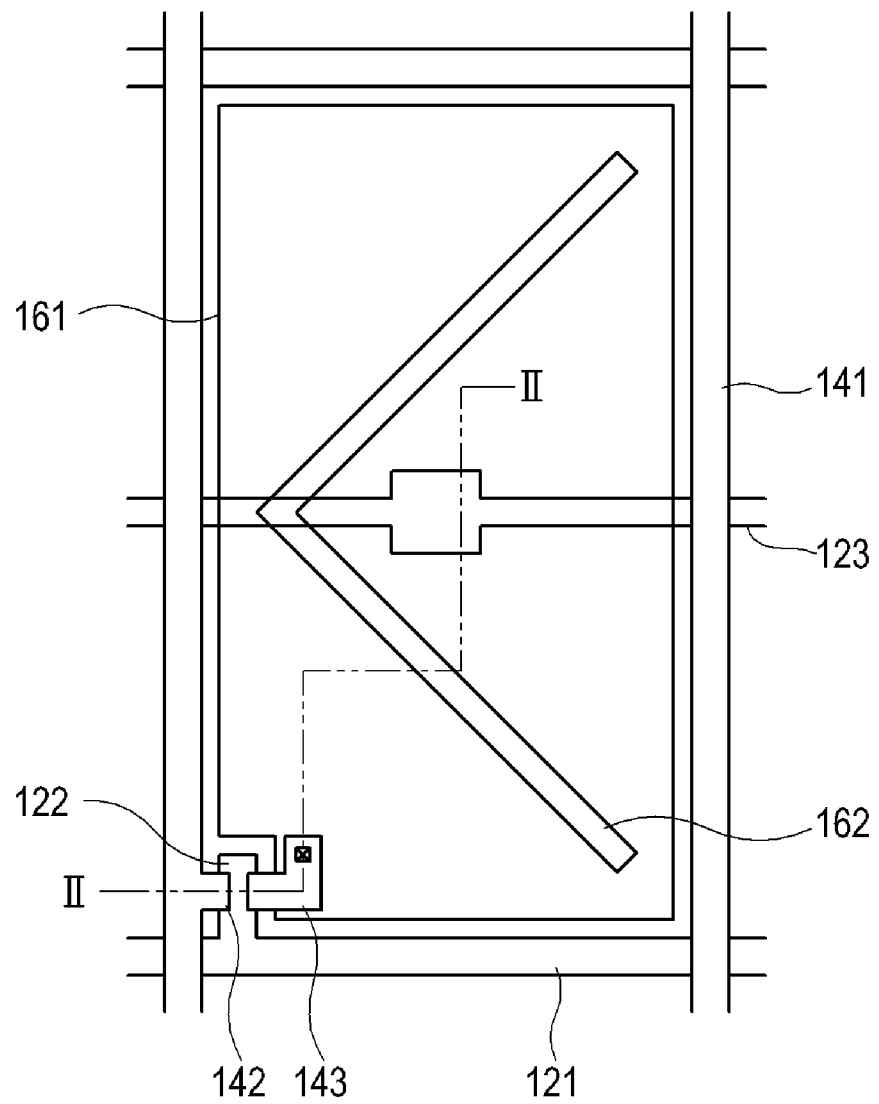
FIG. 1 is a layout of a first substrate according to a first exemplary embodiment of the present invention.

The invention is described more fully hereinafter with reference to the accompanying drawings, in which embodiments of the present invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative size of layers and regions may be exaggerated for clarity. Like reference numerals in the drawings denote like elements.

It will be understood that when an element such as a layer, film, region or substrate is referred to as being "on", "connected to", or "coupled to" another element or layer, it can be directly on, directly connected to, or directly coupled to the other element or layer, or intervening elements or layers may also be present. In contrast, when an element is referred to as being "directly on", "directly connected to", or "directly coupled to" another element or layer, there are no intervening elements or layers present.

Figure 2:
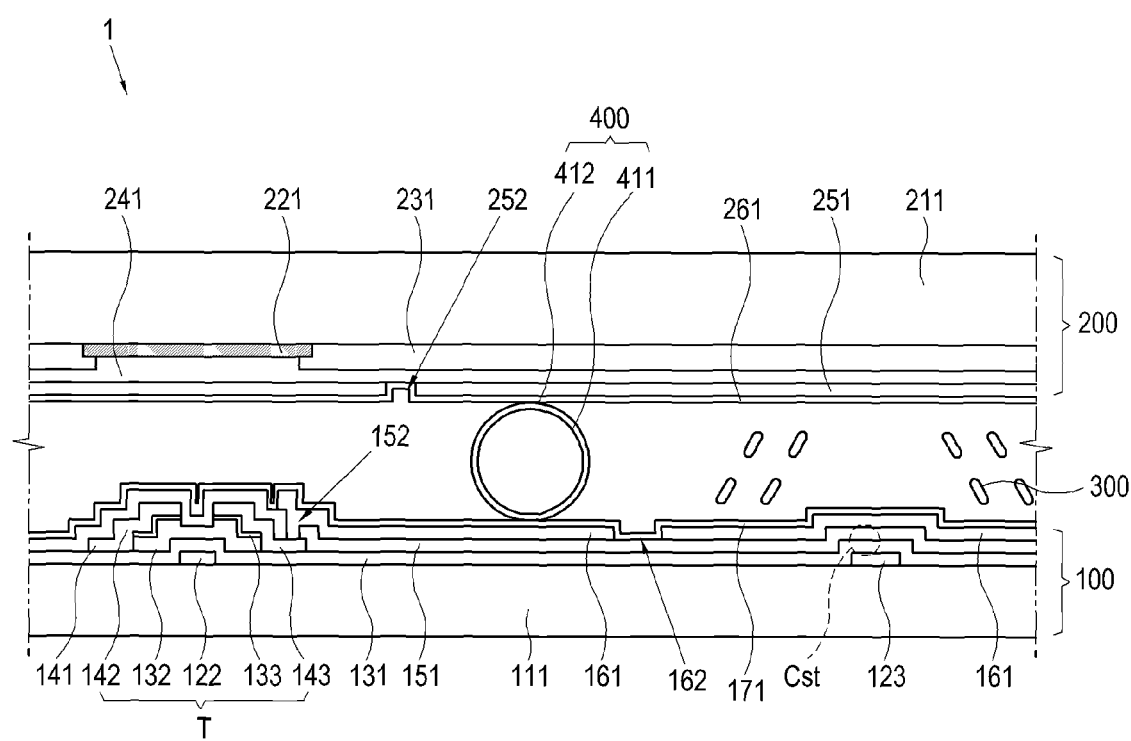
FIG. 2 is a cross sectional view taken along line II-II in FIG. 1.

A LCD device according to a first exemplary embodiment of the present invention is explained referring to FIG. 1 and FIG. 2.

Figure 5A:
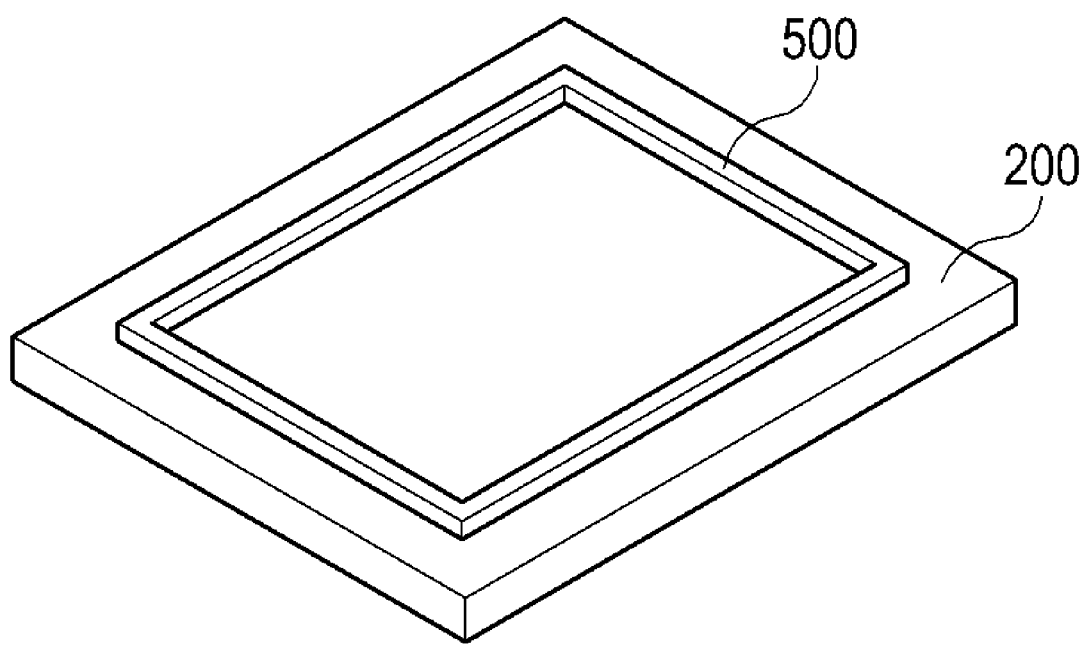
FIG. 5A, FIG. 5B, FIG. 5C, and FIG. 5D illustrate a method of manufacturing the LCD device according to the first exemplary embodiment of the present invention.
Figure 5B:
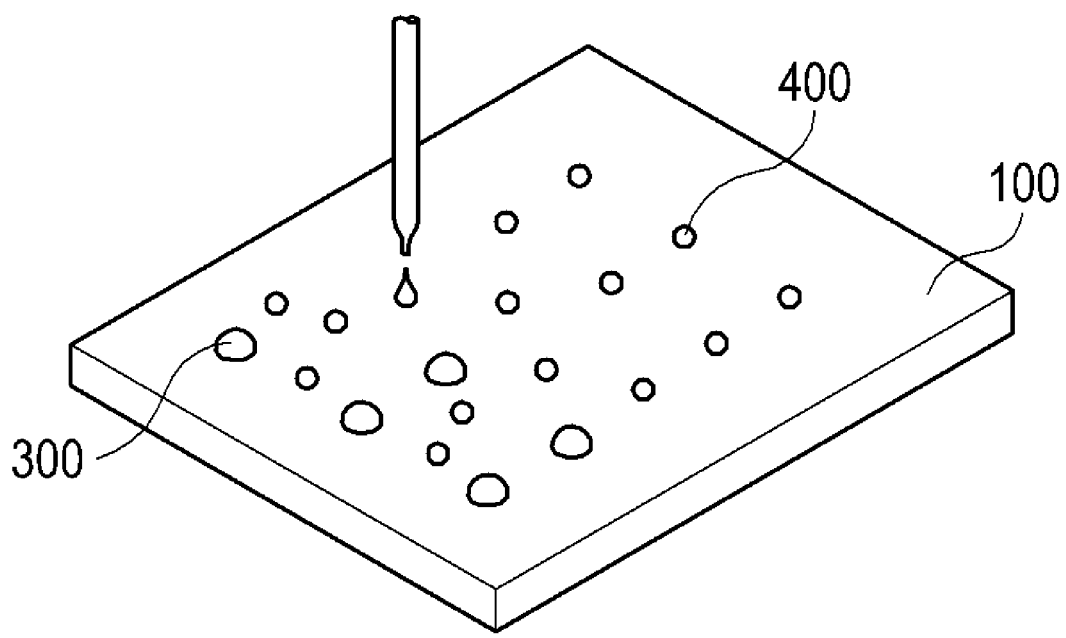
Figure 5C:
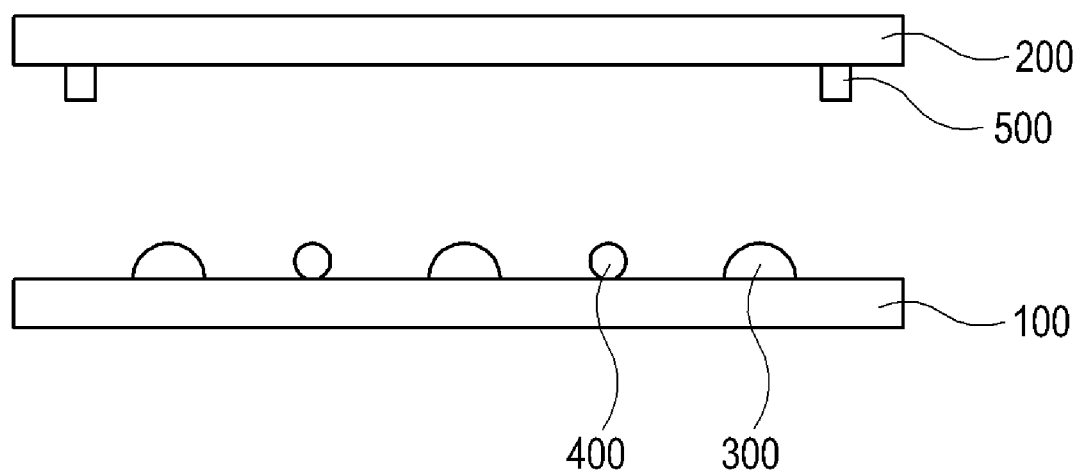
Figure 5D:
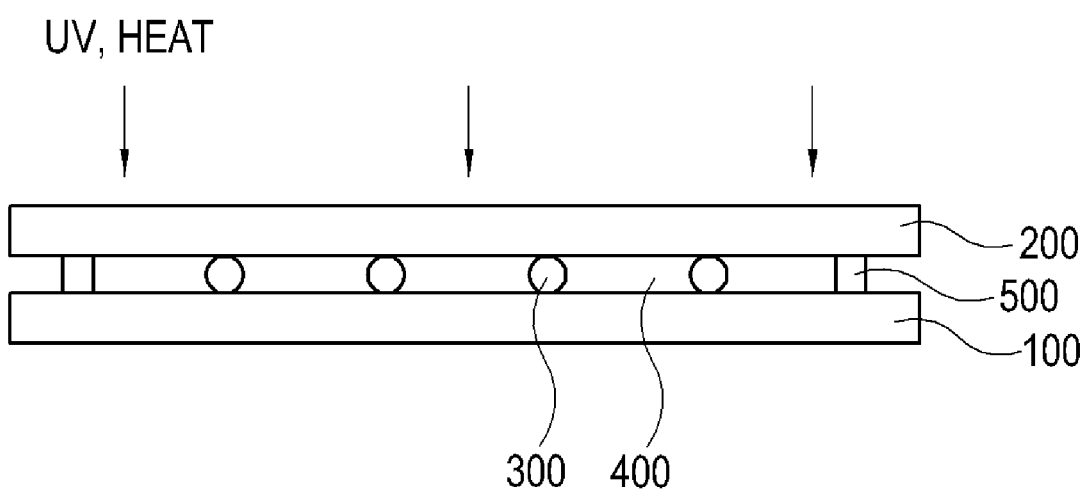

The LCD device 1 includes a first substrate 100 with a thin film transistor 'T' formed thereon, a second substrate 200 facing the first substrate 100, a liquid crystal layer 300 disposed between the two substrates 100 and 200, a spacer 400 for maintaining a cell gap, and a sealant (reference numeral 500 in FIG. 5D).

First, the first substrate 100 is explained.

A gate wire is formed on a first insulating substrate 111. The gate wire may be a single metallic layer or multiple metallic layers. The gate wire includes a gate line 121 disposed in a display region and extending transversely, a gate electrode 122 connected to the gate line 121, and a storage electrode line 123 extending parallel to the gate line 121.

A gate insulating layer 131 which may include silicon nitride (SiNx), etc. is formed on the first insulating substrate 111 to cover the gate wire.

A semiconductor layer 132 including a semiconductor material such as amorphous silicon, etc. is formed on a gate electrode 122 with the gate insulating layer 131 disposed therebetween. An ohmic contact layer 133 including silicide or an n+ hydrogenised amorphous silicon highly doped with a n-type impurity is formed on the semiconductor layer 132. The ohmic contact layer 133 is eliminated on a channel portion of the semiconductor layer 132 disposed between a source electrode 142 and a drain electrode 143.

A data wire is formed on the ohmic contact layer 133 and the gate insulating layer 131. The data wire may also be a single metallic layer or multiple metallic layers. The data wire includes a data line 141 formed longitudinally to cross the gate line 121 and define a pixel, a source electrode 142 branching from the data line 141 and partly extending onto the ohmic contact layer 133, and a drain electrode 143 separated from the source electrode 142 and partly formed on the opposite side of the ohmic contact layer 133.

A passivation layer 151 is formed on the data wire and the semiconductor layer 132 which is not covered by the data wire. A contact hole 152 exposing the drain electrode 143 is formed in the passivation layer 151.

A pixel electrode 161 is formed on the passivation layer 151. The pixel electrode 161 includes a transparent conductive material such as indium tin oxide (ITO) and indium zinc oxide (IZO). The pixel electrode 161 is connected to the drain electrode 143 through the contact hole 152. A pixel electrode cut-off pattern 162 is formed in the pixel electrode 161.

The pixel electrode cut-off pattern 162 and a common electrode cut-off pattern 252 described below divide the liquid crystal layer into a plurality of regions.

A first alignment layer 171 is formed on the pixel electrode 161, and the passivation layer 151. The first alignment layer 171 may include polyimide.

The second substrate 200 is explained below.

A black matrix 211 is formed on a second insulating substrate 211. The black matrix 221 blocks a direct illumination of a light to the thin film transistor T disposed on the first substrate 100. The black matrix 221 includes a photosensitive organic material combined with a black pigment. Carbon black, titanium oxide etc. may be used for the black pigment.

A color filter 231 including a red, a green, and a blue filter is formed on the substrate 200 with the black matrix 221 as a boundary. The color filter 231 assigns color to the light illuminated from a backlight unit (not shown) and transmitted to the liquid crystal layer 300. The color filter 231 may include a photosensitive organic material.

An overcoat layer 241 is formed on the color filter 231 and on the black matrix 221 which is not covered by the color filter 231. The overcoat layer 241 provides a planar surface and protects the color filter 231. The overcoat layer 241 may include a photosensitive acrylic resin.

A common electrode 251 is formed on the overcoat layer 241. The common electrode 251 includes a transparent conductive material such as ITO or IZO. The common electrode 251 and the pixel electrode 161 directly apply a voltage to the liquid crystal layer 300.

The common electrode cut-off pattern 252 is formed in the common electrode 251. As previously mentioned, the common electrode cut-off pattern 252 and the pixel electrode cut-off pattern 162 divide the liquid crystal layer 300 into a plurality of regions.

The pixel electrode cut-off pattern 162 and the common electrode cut-off pattern 252 may be formed in various shapes. Alternatively, the liquid crystal layer 300 may be divided into a plurality of regions by protruding parts instead of the pixel electrode cut-off pattern 162 and the common electrode cut-off pattern 252 described in the other embodiments.

A second alignment layer 261 is formed on the common electrode 251. The second alignment layer 261 may include polyimide.

The liquid crystal layer 300 is disposed between the first substrate 100 and the second substrate 200. The liquid crystal layer 300 adopts a vertically aligned (VA) mode where liquid crystal molecules are arranged so that their lengthwise direction is vertical when no voltage is applied. When the voltage is applied, the liquid crystal molecules of negative anisotropic dielectric constant are arranged perpendicular to an applied electric field.

If the pixel electrode cut-off pattern 162 and the common electrode cut-off pattern 252 are not provided, the liquid crystal molecules without a determined azimuth angle are randomly arranged in various directions and produce a disclination line at a boundary made by the different orientation directions. The pixel electrode cut-off pattern 162 and the common electrode cut-off pattern 252 make a fringe field and determine the liquid crystal molecules' azimuth angle when the voltage is applied to the liquid crystal layer 300. The liquid crystal layer 300 is divided into multiple regions according to an arrangement of the pixel electrode cut-off pattern 162 and the common electrode cut-off pattern 252.

The spacer 400 maintains a cell gap between the first substrate 100 and the second substrate 200 by contacting the first alignment layer 171 and/or the second alignment layer 261.

The spacer 400 has a spherical shape and includes a spacer main body 411 and a coating layer 412 encompassing the spacer main body 411.

The spacer main body 411 may include a resin such as polystyrene. The coating layer 412 includes a dendrimer. The dendrimer is formed by a coupling of monomers having at least three functional groups. The dendrimer, different from a linear polymer, has a plurality of branches extending from a main polymer chain.

The dendrimer denotes a giant mono molecule arranged in a three-dimensional tree branch structure. The dendrimer is quite different from a typical linear polymer in structure and physical characteristics because the dendrimer has an aligned symmetrical structure with high order.

The dendrimer, as exemplarily illustrated below, includes a core part (□), a linking part (Δ), and a terminal part (○). The core part (□) is disposed at a center portion of the dendrimer. A plurality of linking parts (Δ) extending from the core part (□) are formed in multiple generations. Though a structure of three generations is illustrated in the formula below, the structure is not limited thereto but may be varied by adjusting a molecular weight with a number of the generation.

The terminal part (○) disposed at an end portion of the linking part (△) determines a solubility, surface characteristic, etc. The terminal part (○) may include a functional group.

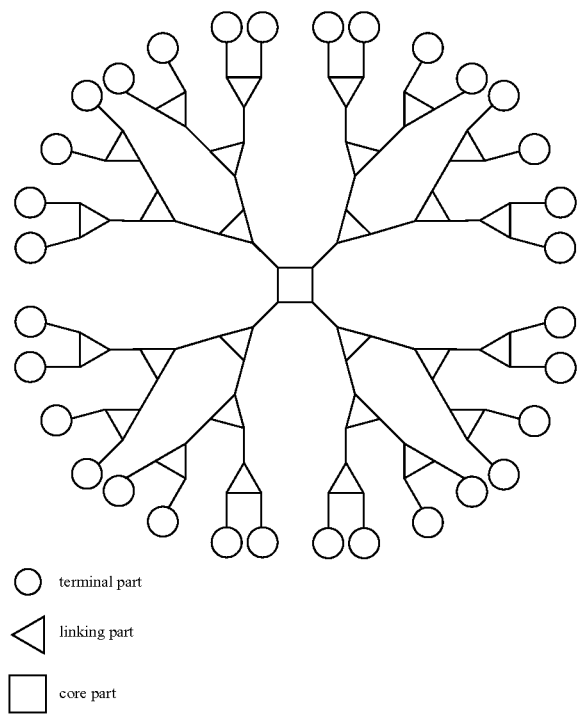

○ terminal part

◁ linking part

□ core part

According to the first exemplary embodiment, the spacer 400 has an excellent adhesion to the first substrate 100 and the second substrate 200 to prevent the alignment layers 171 and 261 from being damaged by vibration or impact to the LCD device.

Figure 3:
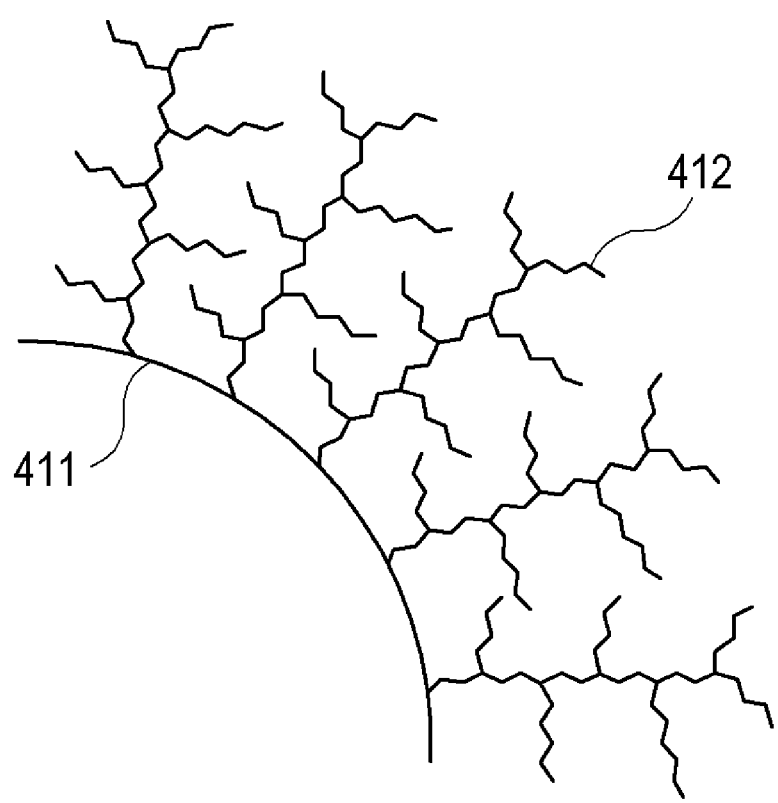
FIG. 3 and FIG. 4 respectively illustrate a structure of a spacer in the LCD device according to the first exemplary embodiment of the present invention.
Figure 4:
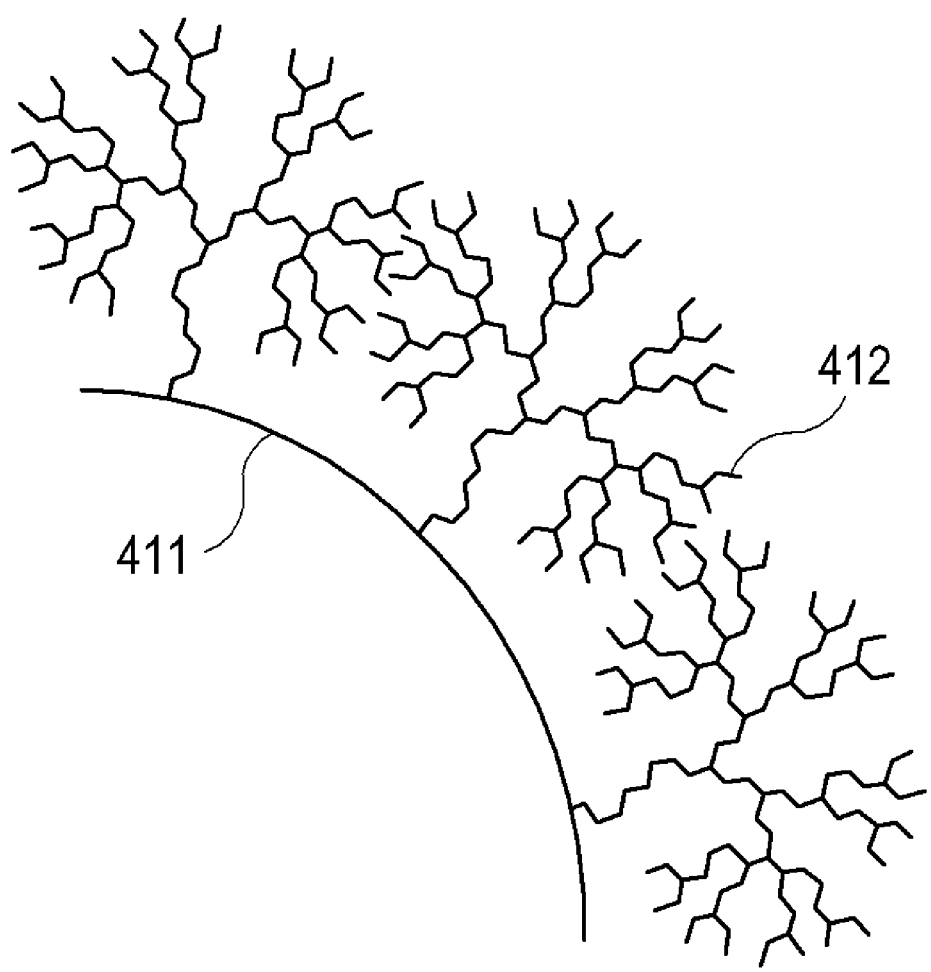

A reason for the excellent adhesion of the spacer 400 is explained by referring to FIG. 3 and FIG. 4. FIG. 3 illustrates the spacer 400 including the coating layer 412 of a dendrimer, and FIG. 4 illustrates the spacer 400 including the coating layer 412 of a dendrimer different from the dendrimer shown in FIG. 3.

As polymer chains of the above two cases are not susceptible to bending, an end portion of the polymer is exposed. The exposed end portion of the polymer enhances the adhesion of the interaction between the spacer and the first alignment layer 171 and/or the second alignment layer 261.

If the coating layer 412 does not include the dendrimer, the end portion of the polymer may not be exposed at the surface because the polymer chains are interacting within the coating layer 412. Accordingly, the interaction of the spacer with the first alignment layer 171 and/or the second alignment layer 261 may be limited, degrading the adhesion of the spacer 400.

Many aliphatic group compounds exist on a surface of the first alignment layer 171 and/or the second alignment layer 261 in the first exemplary embodiment using the liquid crystal layer 300 of a VA mode. Thus, it is desirable for the terminal part (○) to include an aliphatic group compound if the dendrimer is used for the coating layer 412.

On the other hand, an acrylic group, an amine group, an ester group, a carboxyl group, an aldehyde group, a hydroxy group and an ethylene oxide group, or other functional groups, may be provided for the end portion of the dendrimer.

In another exemplary embodiment, the surface of the spacer main body 411 may include an acrylic resin coating layer, where the coating layer 412 directly contacts the acrylic resin coating layer.

In another exemplary embodiment, the first alignment layer 171 and/or the second alignment layer 261 may not be formed depending on a mode of the liquid crystal layer 300. In this case, the spacer 400 may contact the pixel electrode 161, the common electrode 251, and/or the insulating layer rather than the first alignment layer 171 and/or the second alignment layer 261. Even if the spacer 400 contacts a layer other than the first alignment layer 171 and/or the second alignment layer 261, the coating layer 412 may still enhance the adhesion of the spacer 400.

A manufacturing method of the LCD device 1 according to the first exemplary embodiment referring to FIG. 5A, FIG. 5B, FIG. 5C, and FIG. 5D is explained below. An explanation for a known method of manufacturing the first substrate 100 and the second substrate 200 is omitted.

First, a sealant 500 is formed on the second substrate 200. The sealant 500 may be formed on the first substrate 100 by a drawing method using a dispenser. The sealant 500 may be formed in a rectangular shape.

The sealant 500 may include an amine group hardener having epoxy resin and acrylic resin as main ingredients, a filler such as alumina powder, and a solvent such as propylene-glycol-diacetate.

The liquid crystal layer 300 is formed on the first substrate 100 by dropping, and the spacer 400 is dispersed. The liquid crystal layer 300 does not flow on the first substrate 100 by its own viscosity. The spacer 400 is fixed to the first alignment layer 171 on the first substrate 100.

Next, the second substrate 200 is aligned with the first substrate 100 while disposing the sealant 500 therebetween as shown in FIG. 5C.

As shown in FIG. 5D, the sealant 500 is cured by an ultra violet ray and/or heat.

Figure 6:
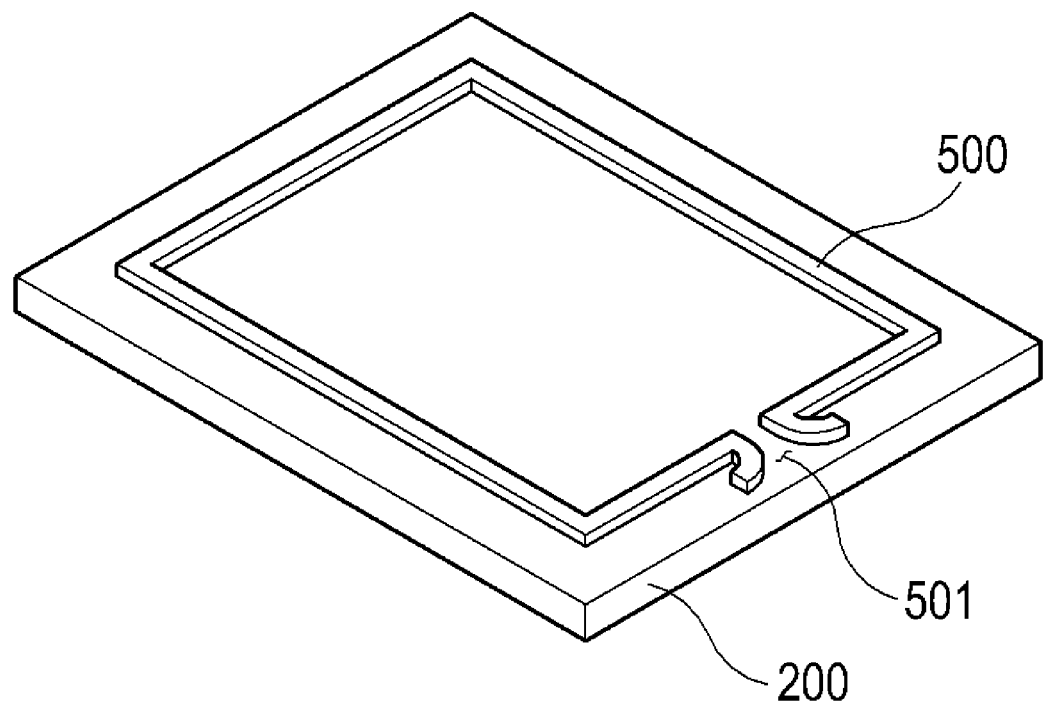
FIG. 6 illustrates another method of manufacturing the LCD device according to the first exemplary embodiment of the present invention.

Referring to FIG. 6, another manufacturing method for the LCD device according to the first exemplary embodiment is explained.

Though the sealant 500 formed on the second substrate 200 is approximately a rectangular shape, the sealant 500 may be open on one side.

After forming the sealant 500, the first substrate 100 and the second substrate 200 are coupled and the liquid crystal layer 300 is formed by injection into the space between the first substrate 100 and the second substrate 200. The injection is performed by a filling method in which a vacuous space between the first substrate 100 and the second substrate 200 is filled with the liquid crystals.

After the injection of the liquid crystals is completed, the open side portion is filled with a resin and the resin is cured with an ultra violet ray and/or heat.

Figure 7:
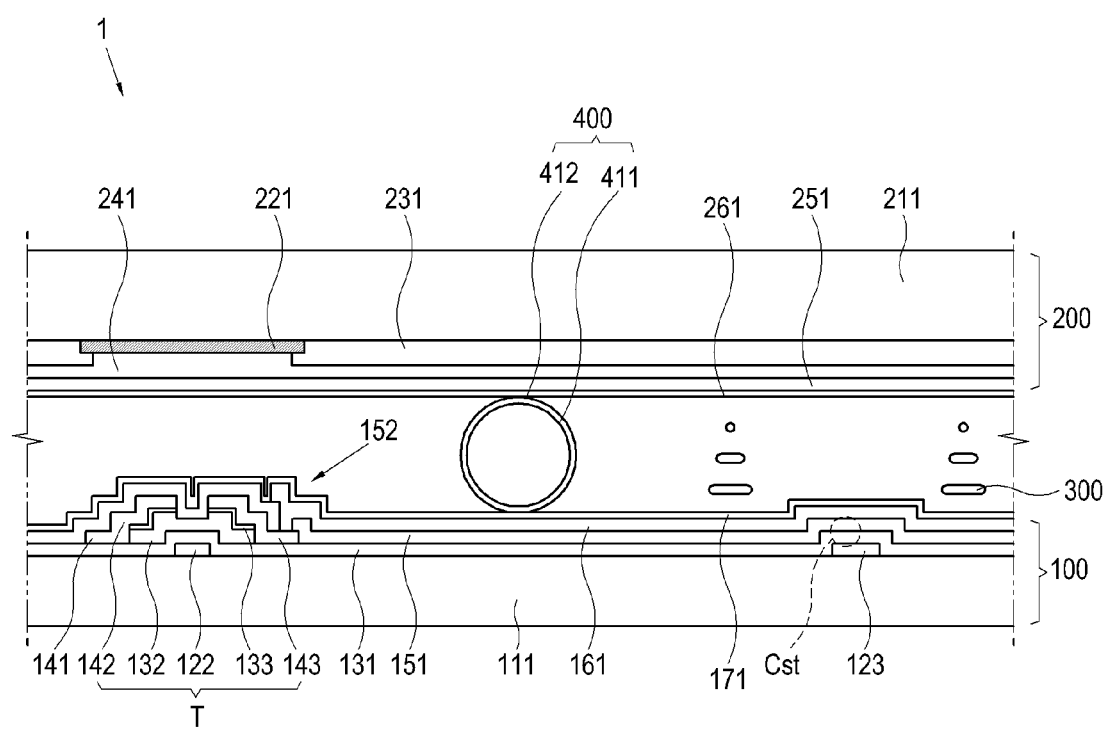
FIG. 7 is a cross sectional view of a LCD device according to a second exemplary embodiment of the present invention.

An LCD device according to a second exemplary embodiment of the present invention is explained referring to FIG. 7.

A cut-off pattern is not formed in a pixel electrode 161 nor in a common electrode 251 and a liquid crystal layer 300 adopts a twisted nematic (TN) mode.

Many aromatic group compounds exist on a surface of a first alignment layer 171 and/or a second alignment layer 261 in the second exemplary embodiment that uses the TN mode liquid crystal layer 300. Thus, it is preferred, but not necessary for a terminal part (○) of a dendrimer as a coating layer 412 to include an aromatic group compound.

As described above, the present invention provides a spacer having improved adhesion and a liquid crystal display device including the spacer having improved adhesion.

Although exemplary embodiments of the present invention have been shown and described in detail hereinabove, it should be clearly understood that many variations and/or modifications of the basic inventive concepts taught herein, which may appear to those skilled in the present art, will still fall within the scope and spirit of the present invention. Thus, it is intended that the present invention cover the modifications and variations of this invention provided they come within the scope of the appended claims and their equivalents.

What is claimed is:

1. A spacer, comprising:
a spacer main body; and
a coating layer encompassing the spacer main body and comprising a dendrimer,
wherein the dendrimer comprises:
a core part disposed at a central portion of the dendrimer;
a terminal part comprising an aliphatic group compound; and
a linking part connecting the core part with the terminal part.

2. The spacer of claim 1, wherein the spacer has a spherical shape.

3. A spacer comprising:
a spacer main body; and
a coating layer encompassing the spacer main body and comprising a dendrimer,
wherein the dendrimer comprises:
a core part disposed at a central portion of the dendrimer;
a terminal part comprising an aromatic group compound; and
a linking part connecting the core part with the terminal part.

4. The spacer of claim 3, wherein the spacer main body comprises polystyrene.

5. The spacer of claim 3, wherein the spacer main body comprises an acrylic resin layer in contact with the coating layer.

6. The spacer of claim 3, wherein the spacer has a spherical shape.

7. A spacer comprising:
a spacer main body; and
a coating layer encompassing the spacer main body and comprising a dendrimer,
wherein the spacer main body comprises polystyrene.

8. A spacer comprising:
a spacer main body; and
a coating layer encompassing the spacer main body and comprising a dendrimer,
wherein the spacer main body comprises an acrylic resin layer in contact with the coating layer.

9. A liquid crystal display (LCD) device, comprising:
a first substrate;
a second substrate facing the first substrate;
a liquid crystal layer disposed between the first substrate and the second substrate; and
a spacer maintaining a gap between the first substrate and the second substrate,
wherein the spacer comprises:
a spacer main body; and
a coating layer encompassing the spacer main body and comprising a dendrimer.

10. The LCD device of claim 9, wherein the first substrate comprises a first alignment layer;
the second substrate comprises a second alignment layer; and
the coating layer contacts at least one of the first alignment layer and the second alignment layer.

11. The LCD device of claim 10, wherein the first substrate further comprises a pixel electrode formed with a pixel electrode cut-off pattern therein;
the second substrate further comprises a common electrode formed with a common electrode cut-off pattern therein;
the liquid crystal layer adopts a vertical align (VA) mode; and
the dendrimer comprises a core part, a branch type linking part, and a terminal part, wherein the terminal part comprises an aliphatic group compound.

12. The LCD device of claim 10, wherein the liquid crystal layer adopts a twisted nematic (TN) mode; and
the dendrimer comprises a core part, a branch type linking part, and a terminal part, wherein the terminal part comprises an aromatic group compound.

13. The LCD device of claim 9, wherein the spacer has a spherical shape.

14. The LCD device of claim 9, wherein the spacer main body comprises polystyrene.

15. The LCD device of claim 9, wherein the spacer main body comprises an acrylic resin layer in contact with the coating layer.

16. The LCD device of claim 9, wherein the dendrimer comprises:
a core part disposed at a central portion of the dendrimer;
a terminal part comprising an aliphatic group compound; and
a linking part connecting the core part with the terminal part.

17. The LCD device of claim 9, wherein the dendrimer comprises:
a core part disposed at a central portion of the dendrimer;
a terminal part comprising an aromatic group compound; and
a linking part connecting the core part with the terminal part.

* * * * *